(12) United States Patent
Toyomura

(10) Patent No.: US 7,078,997 B2
(45) Date of Patent: Jul. 18, 2006

(54) TRANSFORMER ASSEMBLY, AND POWER CONVERSION APPARATUS AND SOLAR POWER GENERATION APPARATUS USING THE SAME

(75) Inventor: Fumitaka Toyomura, Nara (JP)

(73) Assignee: Canon Kabushiki Kaisha, Tokyo (JP)

( * ) Notice: Subject to any disclaimer, the term of this patent is extended or adjusted under 35 U.S.C. 154(b) by 223 days.

(21) Appl. No.: 10/835,009

(22) Filed: Apr. 30, 2004

(65) Prior Publication Data

US 2004/0222873 A1 Nov. 11, 2004

(30) Foreign Application Priority Data

May 9, 2003 (JP) ............................. 2003-132158

(51) Int. Cl.
*H01F 27/29* (2006.01)

(52) U.S. Cl. ...................................... 336/192
(58) Field of Classification Search .................. 336/65, 336/192, 220–225
See application file for complete search history.

(56) References Cited

U.S. PATENT DOCUMENTS

| | | | |
|---|---|---|---|
| 4,112,481 A | 9/1978 | Roge et al. ................. 361/395 |
| 4,665,357 A * | 5/1987 | Herbert ....................... 323/361 |
| 4,814,735 A * | 3/1989 | Williamson ................. 336/65 |
| 4,845,606 A * | 7/1989 | Herbert ........................ 363/24 |
| 5,093,646 A | 3/1992 | Herbert ....................... 336/225 |
| 5,585,773 A | 12/1996 | Murata et al. ................. 336/90 |
| 5,589,006 A | 12/1996 | Itoyama et al. ............. 136/248 |
| 5,805,431 A | 9/1998 | Joshi et al. .................. 361/836 |
| 5,849,107 A | 12/1998 | Itoyama et al. ............. 136/248 |
| 6,066,797 A | 5/2000 | Toyomura et al. .......... 136/251 |
| 6,093,884 A | 6/2000 | Toyomura et al. .......... 136/244 |
| 6,114,932 A * | 9/2000 | Wester et al. ................. 336/65 |
| 6,137,392 A * | 10/2000 | Herbert ....................... 336/175 |
| 6,207,889 B1 | 3/2001 | Toyomura et al. .......... 136/251 |
| 6,245,987 B1 | 6/2001 | Shiomi et al. ............... 136/244 |
| 6,657,118 B1 | 12/2003 | Toyomura et al. .......... 136/244 |
| 6,734,775 B1 | 5/2004 | Chung ......................... 336/198 |
| 6,927,667 B1 | 8/2005 | Busletta et al. ............. 336/208 |
| 2001/0040453 A1 | 11/2001 | Kataoka et al. ............. 136/251 |
| 2002/0179140 A1 | 12/2002 | Toyomura .................. 136/251 |
| 2003/0210562 A1 | 11/2003 | Takehara et al. ............. 363/24 |
| 2004/0174240 A1 | 9/2004 | Suzui ........................... 336/150 |
| 2004/0183642 A1 | 9/2004 | Suzui ........................... 336/192 |

FOREIGN PATENT DOCUMENTS

EP          0 218 846          4/1987

(Continued)

*Primary Examiner*—Tuyen T Nguyen
(74) *Attorney, Agent, or Firm*—Fitzpatrick, Cella, Harper & Scinto

(57) ABSTRACT

In a transformer assembly formed by using a plurality of transformers each formed by winding a primary coil and a secondary coil around a winding core, one terminal and the other terminal of the primary coil are arranged on opposite sides of the winding core, one terminal and the other terminal of the secondary coil are arranged on opposite sides of the winding core, and N transformers in which the coils and the terminals are laid out are arrayed in the lead-out direction of the terminals of the primary coil while M transformers in which the coils and the terminals are laid out are arrayed in the lead-out direction of the terminals of the secondary coil so as to make a line which connects one terminal and the other terminal of the primary coil cross a line which connects one terminal and the other terminal of the secondary coil.

11 Claims, 17 Drawing Sheets

FOREIGN PATENT DOCUMENTS

| | | |
|---|---|---|
| GB | 2 291 736 | 1/1996 |
| JP | 6-69035 | 3/1994 |
| JP | 2547442 | 5/1997 |
| JP | 2001-237126 | 8/2001 |
| WO | WO 89/10621 | 11/1989 |

* cited by examiner

PARALLEL CONNECTION

SERIES CONNECTION

TRANSFORMER ASSEMBLY, AND POWER CONVERSION APPARATUS AND SOLAR POWER GENERATION APPARATUS USING THE SAME

FIELD OF THE INVENTION

The present invention relates to a transformer assembly formed by connecting a plurality of high-step-up low-profile transformers, and a power conversion apparatus and power generation apparatus using the transformer assembly and, for example, to a transformer assembly used for a conversion apparatus which converts a power generated by a solar battery.

BACKGROUND OF THE INVENTION

As part of recent approach to environmental problems, attempts have been made to cause power conversion apparatuses to convert a DC power generated by solar batteries or fuel batteries into an AC power and supply it to domestic loads (to be simply referred to as "loads" hereinafter in this specification) or commercial power systems (to be simply referred to as "systems" hereinafter in this specification) or convert a DC power into a predetermined DC voltage and use it to drive DC loads.

Most power conversion apparatuses used for the above purposes have a function of stepping up the output voltage from a solar battery to a predetermined voltage. The power stepped up is used for a DC load or input to a DC/AC conversion apparatus, converted into an AC power, and then connected to systems.

There is also a method of raising the output voltage from solar batteries by connecting them in series. However, connecting solar batteries in series requires a number of working steps and accordingly increases the cost. In addition, the non-power-generation area of the solar power generation apparatus increases, and the influence of partial shade becomes large.

To solve these problems, a solar power generation apparatus has been developed, which extracts an output power with a high voltage and small current by making the number of series-connected solar batteries as small as possible and highly stepping up the output voltage from the solar batteries.

In this solar power generation apparatus, only a low voltage of about 1 V can be output per solar panel. Hence, a considerably high-step-up DC/DC conversion apparatus is necessary. In addition, the apparatus must incorporate a high-step-up transformer.

Conventionally, a push-pull circuit is used as an example of the circuit scheme of the high-step-up DC/DC conversion apparatus as described above.

To generate a high voltage from a low voltage, for example, an inverter apparatus using a transformer assembly has been proposed. This transformer assembly uses a plurality of transformers whose primary coils are connected in parallel and secondary coils are connected in series to implement high step-up. Arrangements which embody similar transformer assembles have also been proposed.

However, the DC/DC conversion apparatus connected to solar batteries is preferably arranged near the solar batteries to reduce transmission loss of the generated power of the solar batteries. The conversion apparatus is required to be as thin as possible in correspondence with the low-profile shape of the solar batteries.

Especially, a transformer as a constituent component of the DC/DC conversion apparatus greatly affects the apparatus thickness. Although the apparatus thickness is preferably small, it can hardly be reduced in the conventional transformer structure.

FIG. 5 shows a conventional push-pull transformer 501 which has a pin terminal 503 to be used to mount the transformer on a printed circuit board. In this transformer, primary coils 504 and 505 are wound on a winding core and led out toward a pin terminal 503. The end portions are connected to terminals 501a to 501d of the pin terminal 503, thereby forming an output terminal.

When a low-voltage large-current solar battery is used as a power supply, a large current flows to the primary coil of the transformer. Hence, a flat-type copper wire or a thick copper foil is preferably used as the primary coil. However, when such a material is used, it is very difficult to wind the primary coils and lead them out to the pin terminal to form an output terminal, unlike the conventional transformer.

FIGS. 6A and 6B show examples of parallel connection (FIG. 6A) and series connection (FIG. 6B) of conventional transformers on a printed circuit board.

Referring to FIGS. 6A and 6B, reference numerals 601 to 604 denote transformers; 605 to 608, input terminals of push-pull circuits; and 609, a through hole. A portion indicated by a solid line is a land on the upper surface of the printed circuit board, to which the pin terminal or input terminal of a transformer is connected. A portion indicated by a broken line is a land on the lower surface of the printed circuit board.

FIGS. 16 and 17 are schematic views showing connection circuits for the transformers and input terminals shown in FIGS. 6A and 6B.

For the illustrative convenience, switching elements 1601, 1602, 1701, and 1702 connected to terminals 601c, 602d, 604c, and 604d shown in FIGS. 16 and 17 are not illustrated in FIGS. 6A and 6B.

As shown in FIGS. 6A and 6B, when transformers are connected in series or in parallel on a printed circuit board, conductors which connect the input terminals 605 to 608 to the respective terminals cross on the printed circuit board. The conductors must be led to the lower surface of the circuit board through the through hole 609 or the like. This greatly increases the wiring resistance and decreases the efficiency. In addition, the printed circuit board becomes bulky depending on the wiring pattern which connects the terminals of the transformers.

Even when the connection positions of the primary coils and pin terminals in each transformer are changed, the same problems as described above are posed.

SUMMARY OF THE INVENTION

According to the present invention, there is provided a transformer assembly formed by using a plurality of transformers each formed by winding a primary coil and a secondary coil around a winding core, wherein one terminal and the other terminal of the primary coil are arranged on opposite sides of the winding core, one terminal and the other terminal of the secondary coil are arranged on opposite sides of the winding core, and N transformers in which the coils and the terminals are laid out are arrayed in a lead-out direction of the terminals of the primary coil while M transformers in which the coils and the terminals are laid out are arrayed in a lead-out direction of the terminals of the secondary coil so as to make a line which connects one terminal and the other terminal of the primary coil cross a line which connects one terminal and the other terminal of the secondary coil.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

[Structure]

Figure 1:
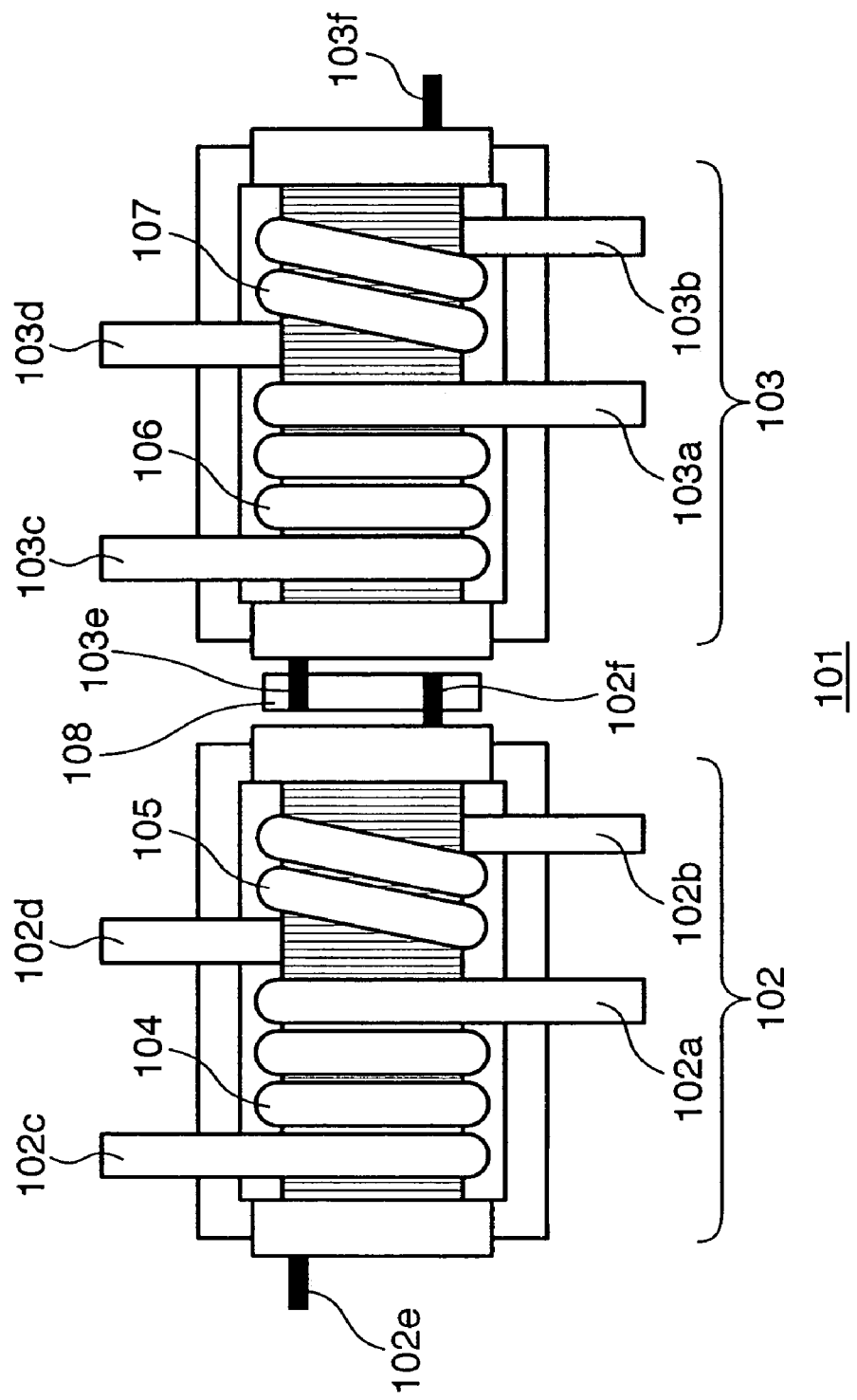
FIG. 1 is a view showing an example of the structure of a transformer assembly according to an embodiment of the present invention.
Figure 2:
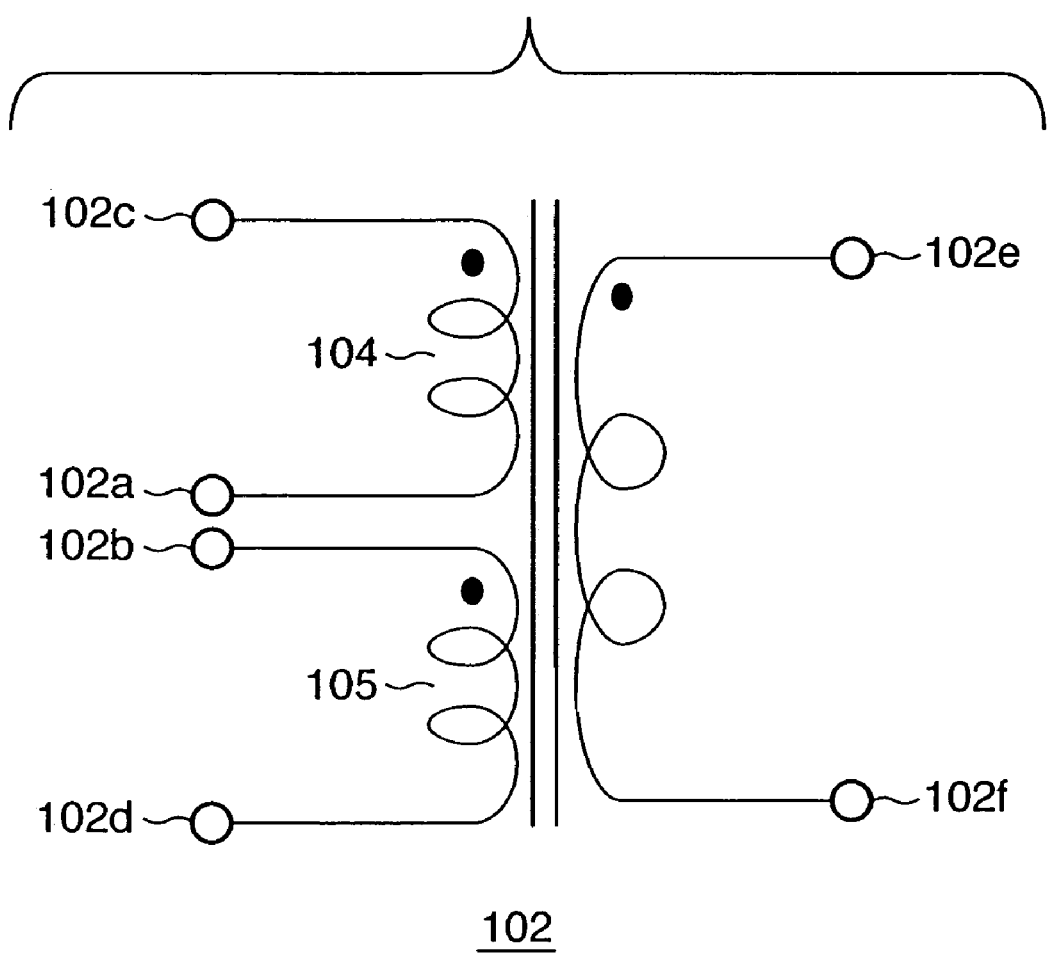
FIG. 2 is a circuit diagram showing the structure of a push-pull transformer.

FIG. 1 is a view showing a transformer assembly 101 according to an embodiment. This assembly is formed by connecting transformers 102 and 103 having the same structure in the lead-out direction of secondary coils through a land 108. The transformers 102 and 103 are push-pull circuit transformers. FIG. 2 is a circuit diagram of the push-pull transformer.

Figure 3:
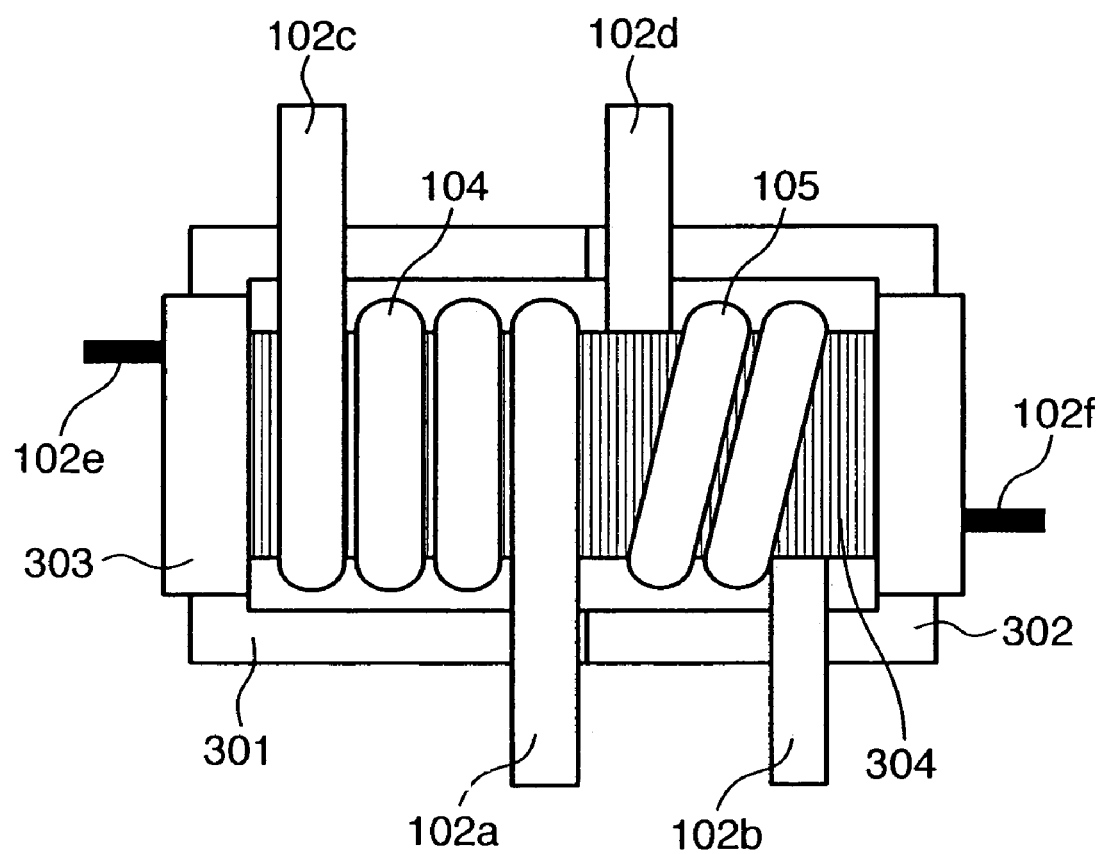
FIG. 3 is a view showing an example of the structure of a transformer according to the embodiment of the present invention.
Figure 4:
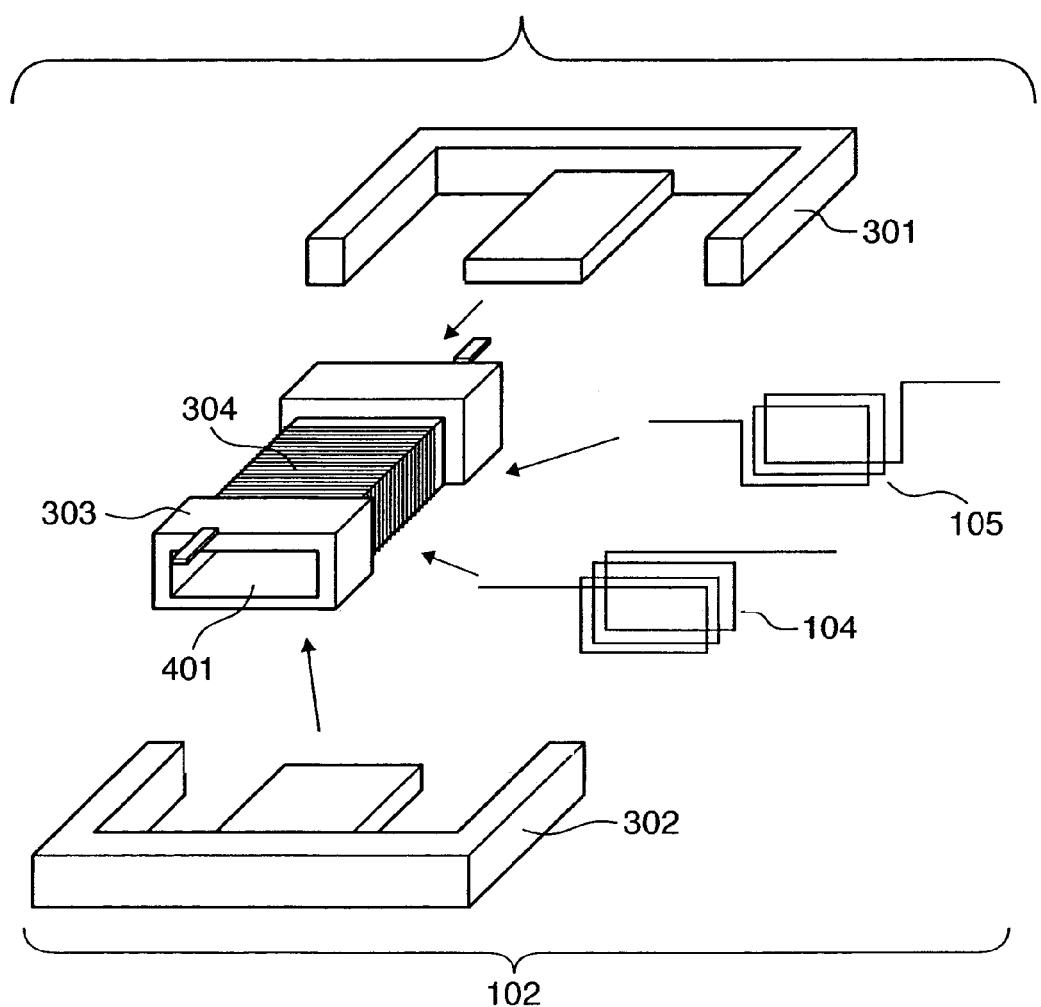
FIG. 4 is an exploded view of the transformer according to the embodiment of the present invention.
Figure 5:
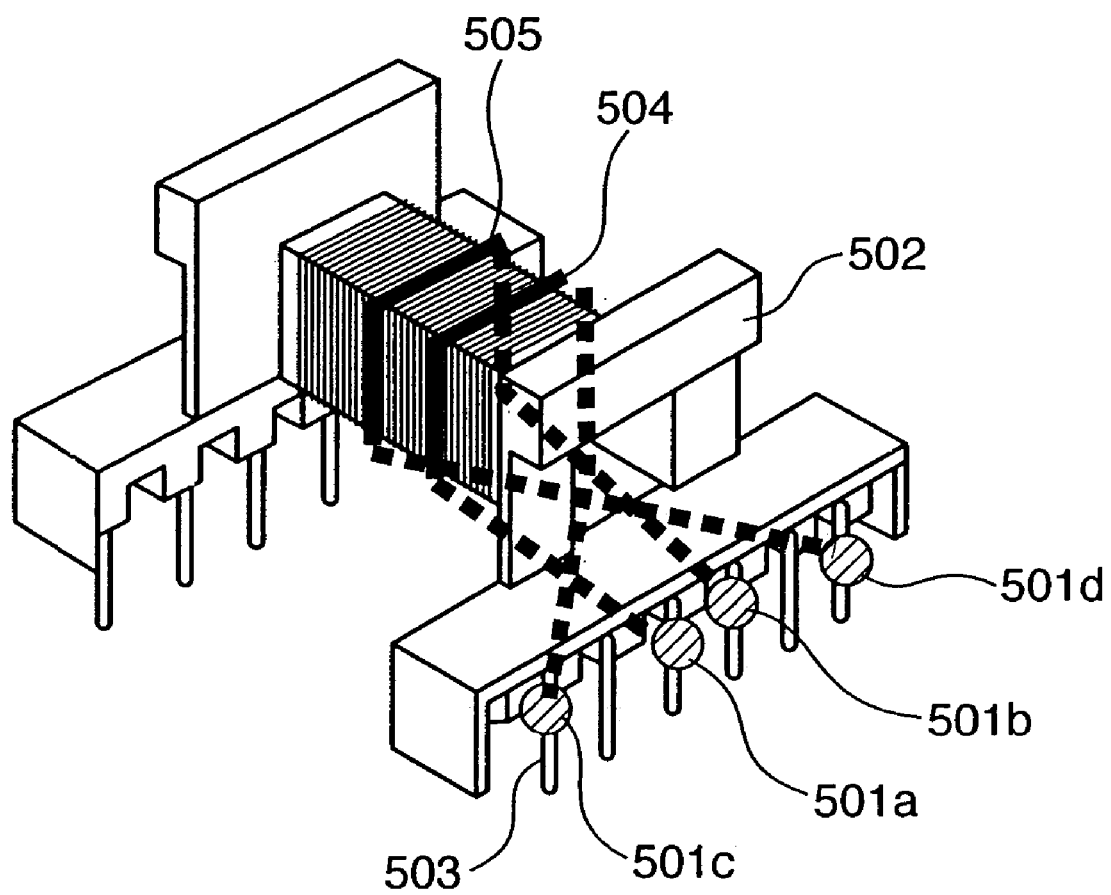
FIG. 5 is a schematic view of a conventional push-pull transformer.
Figure 6A:
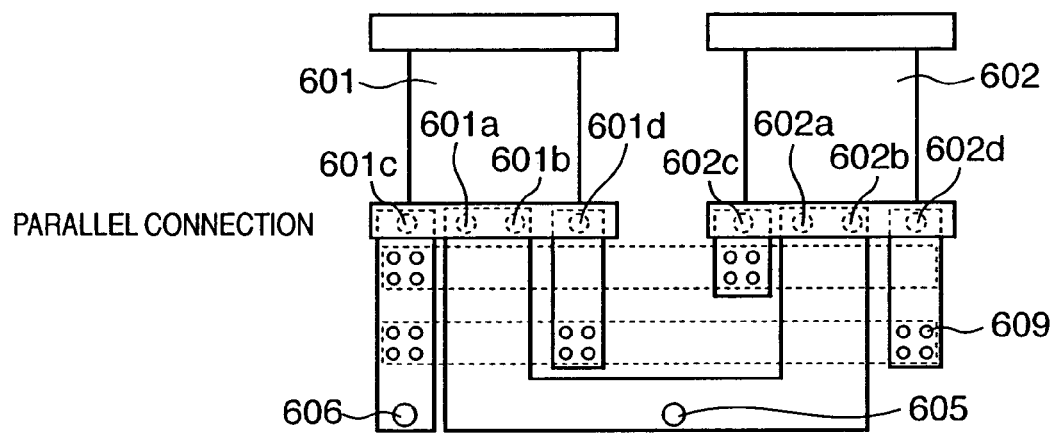
FIGS. 6A and 6B are connection diagrams of the conventional push-pull transformers.
Figure 6B:
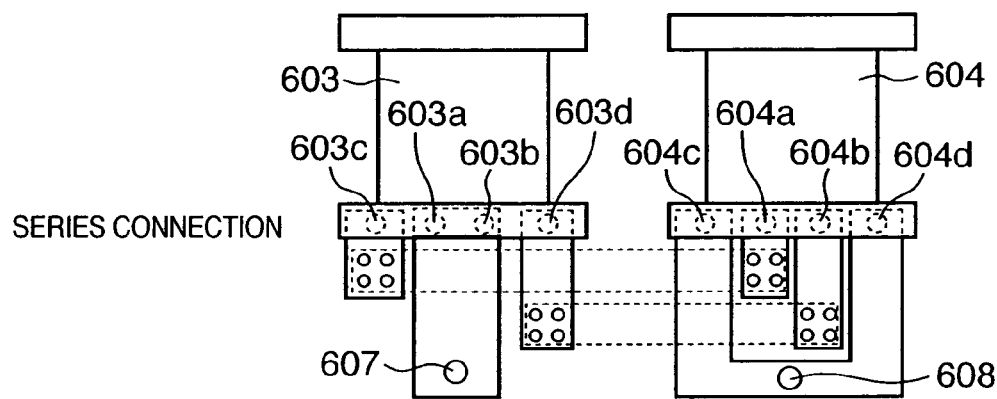

Reference numerals 104 to 107 denote primary coils; 102a to 102d and 103a to 103d, terminals of the primary coils; and 102e, 102f, 103e, and 103f, terminals of the secondary coils. FIG. 3 is a view showing details of the transformer 102. FIG. 4 is an exploded view of the transformer 102.

The structure of the transformer used in this embodiment will be described here with reference to FIGS. 1, 3, and 4 in conjunction with a method of forming it.

The secondary coil is first connected to the terminal 102e, which is integrated with a bobbin 303, and wound around a bobbin a predetermined number of times such that a desired high voltage can be output. Then, the secondary coil is connected to the terminal 102f arranged on the opposite side of the bobbin.

The primary coil 104 is wound around the bobbin with the wound secondary coil several times so that a line that connects the terminals 102a and 102c at the two ends crosses a line that connects the terminals 102e and 102f at the two ends of the secondary coil.

The other primary coil 105 is also wound around the bobbin adjacent to the primary coil 104 without overlapping it. The primary coils 104 and 105 have opposite winding directions on the bobbin. Cores 301 and 302 are inserted into a through hole 401 of the bobbin, made to abut against each other, and fixed by taping, thereby forming the transformer 102. An insulating film or insulating paper may be inserted between the primary coils and the cores to insulate them from each other.

The transformers 102 and 103 formed in the above-described way are placed in a line, as shown in FIG. 1, on a printed circuit board. The secondary coil terminals 102f and 103e are connected on a land formed on the printed circuit board, thereby forming a transformer assembly.

In this embodiment, the transformers are connected on a printed circuit board. Instead, the transformer assembly can also be formed by directly connecting the terminals. In addition, when the transformer assembly formed by directly connecting the terminals of the transformers is sealed by an epoxy resin or the like, the transformer assembly can be used as one element. In this case, the terminals of the transformers, semiconductor elements such as switching elements and diodes, and bear chips may be wired and sealed.

In this embodiment, the transformer assembly is formed by placing two transformers in a line in the lead-out direction of the secondary coil terminals. However, the layout of transformers is not limited to this. The transformer assembly may be formed by placing two transformers in a line in the lead-out direction of the primary coil terminals or by placing two transformers in a line in the lead-out direction of the primary coil terminals and two other transformers in a line in the lead-out direction of the secondary coil terminals.

Figure 15:
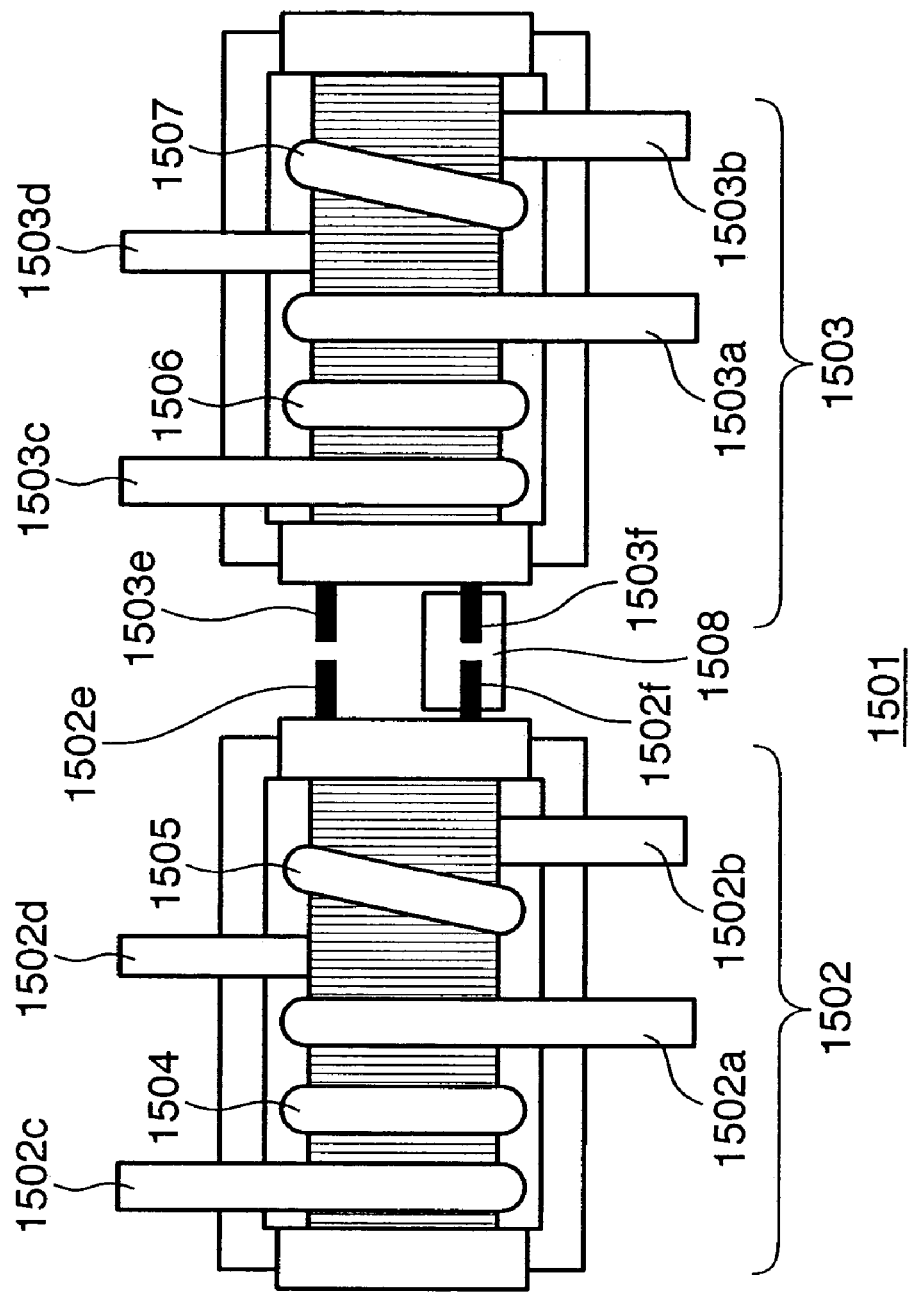
FIG. 15 is a view showing an example of connection of a plurality of transformers.
Figure 16:
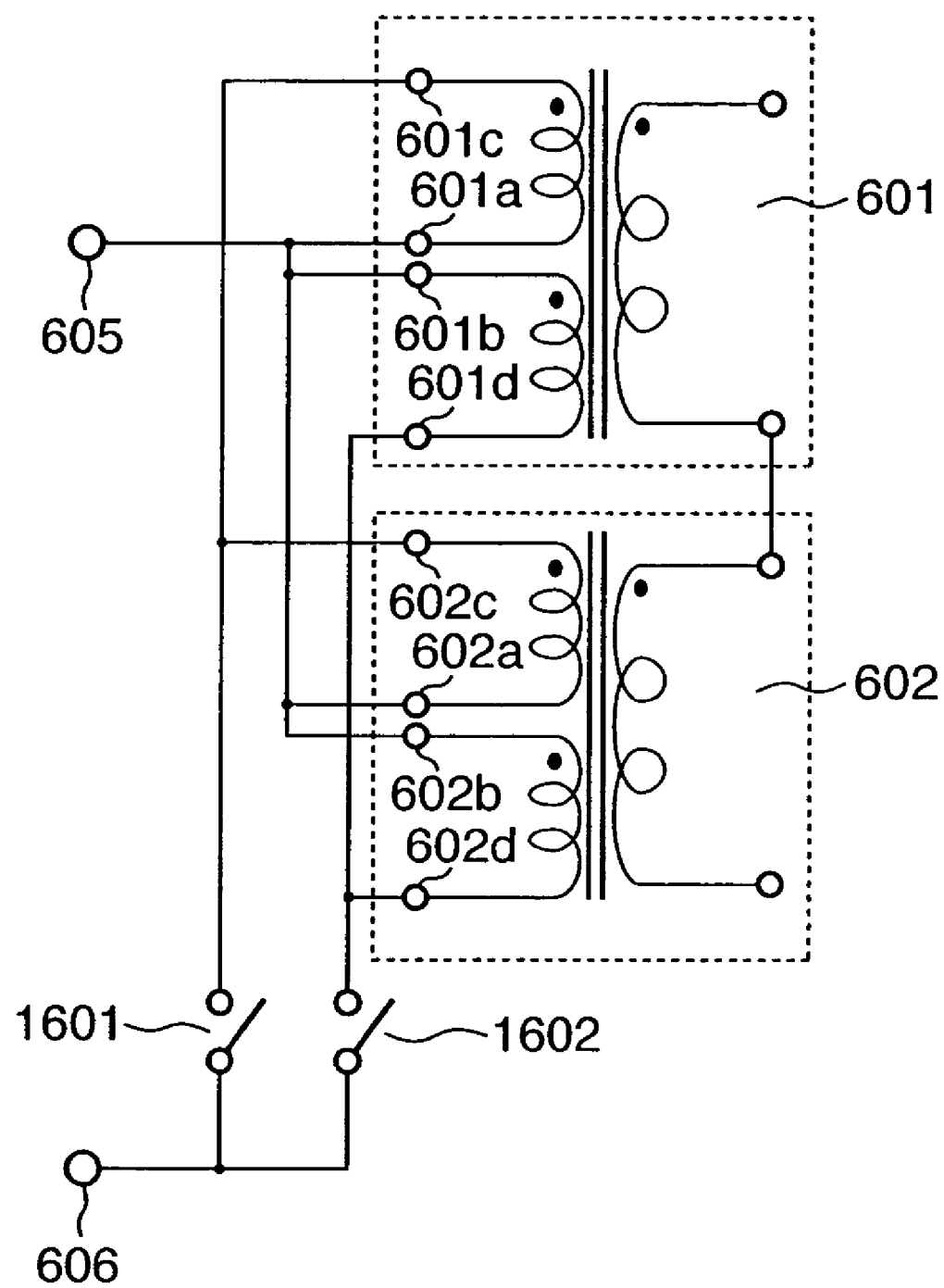
FIG. 16 is a view showing an example of parallel connection of transformers.
Figure 17:
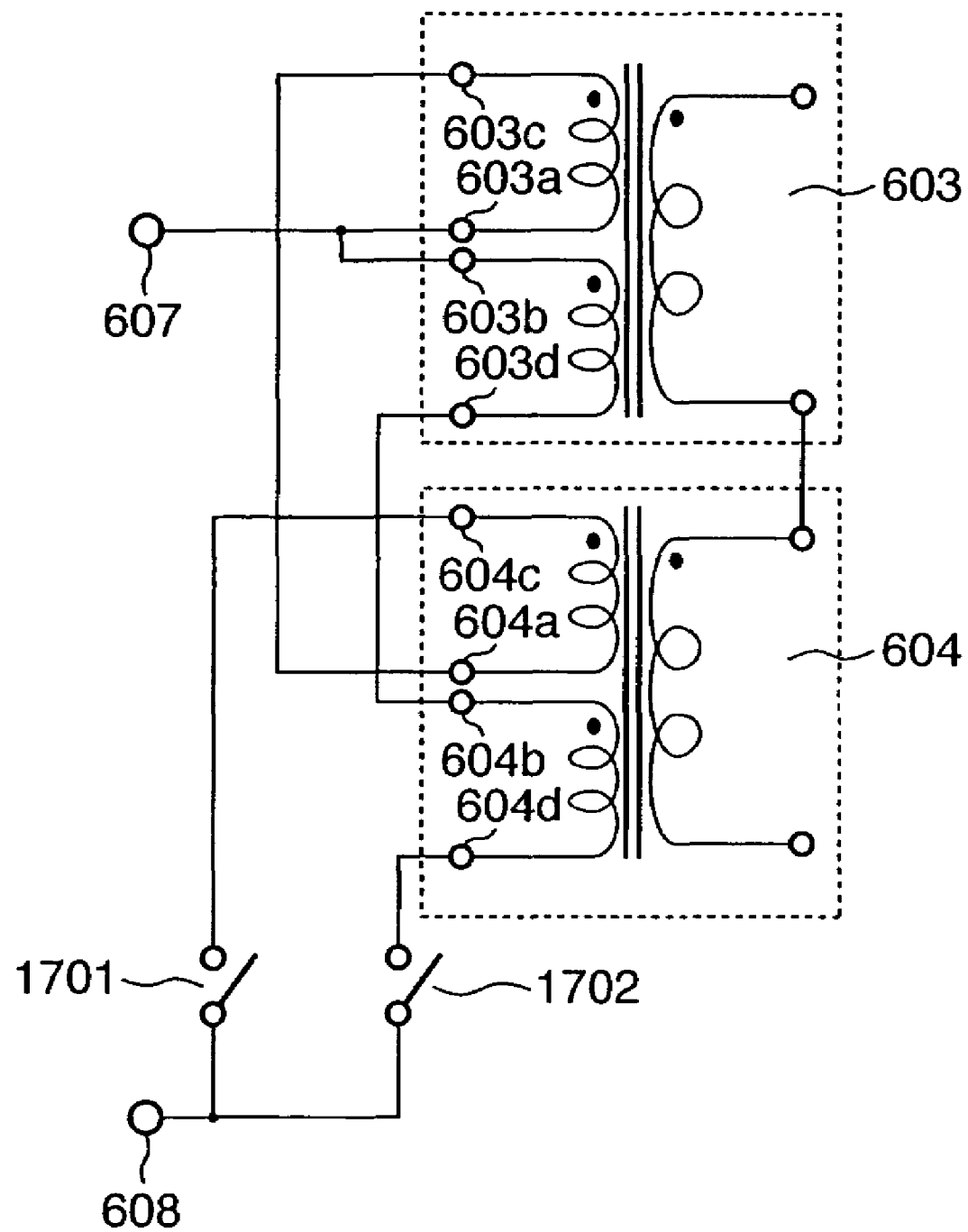
FIG. 17 is a view showing an example of series connection of transformers.

These structures will be described later in detail in embodiments. As shown in FIG. 15, a transformer assembly 1501 may be formed by leading secondary coil terminals to the same side and connecting terminals 1502f and 1503f through a land 1508. However, when the voltage difference between the secondary coil terminals becomes large, an appropriate spatial distance is necessary, and accordingly, each transformer needs to be larger. Hence, the secondary coil terminals are preferably arranged on the opposite sides of the cores.

When the transformer assembly with the above-described transformers is used, the following functions and effects can be expected.

The terminal lead-out directions of the primary coils and secondary coil cross, and the terminals are arranged on the opposite sides of the cores. For these reasons, a high-efficiency high-step-up low-profile transformer can be formed by using a low-resistance conductor such as a flat-type copper wire which is difficult to process in directions other than the winding direction.

In addition, when a plurality of transformers are arrayed, and corresponding terminals are connected, a high-step-up transformer assembly can easily be formed. The terminals can be connected on the same land by the shortest route without using any through hole on the circuit board. Hence, the efficiency of a power conversion apparatus using the transformer assembly can be increased.

Furthermore, since the transformer assembly can be formed by using transformers with the same structure, the transformers need not individually be managed.

The winding and core used for the primary and secondary coils and the bobbin used as a winding core will be described below in detail.

[Winding]

The winding used in the present invention will be described next in detail. The winding used in the present invention is not particularly limited. Any winding can be used as long as it has heat resistance, flexibility, oil resistance, solderability, and insulation durability suitable for the use conditions and forming conditions of the transformer.

More specifically, wires in the list of JIS C 3202 "enameled wires" can be used, including a class-1 oil enameled copper wire, class-2 oil enameled copper wire, class-0 formal copper wire, class-1 formal copper wire, class-2 formal copper wire, class-0 formal aluminum wire, class-1 formal aluminum wire, formal flat-type copper wire, class-0 polyester copper wire, class-1 polyester copper wire, class-2 polyester copper wire, class-1 polyurethane copper wire, class-2 polyurethane copper wire, class-3 polyurethane copper wire, class-0 self-bonding polyurethane copper wire, class-1 self-bonding polyurethane copper wire, class-2 self-bonding polyurethane copper wire, class-0 polyester imide copper wire, class-1 polyester imide copper wire, and class-2 polyester imide copper wire.

As the primary coil of the present invention, a flat-type copper wire is preferably used because of its high space efficiency and low-loss properties for a large current. A flat-type copper wire with an insulating material formed on it in advance may be used. A bare or tinned copper wire can also be used from the viewpoint of workability and dimensional stability.

It is also preferable to reduce loss due to the skin effect by using a wire (litz wire) formed by twisting a plurality of wire rods selected from the above list of "enameled wires". Alternatively, a parallel array multiple wire strip formed by parallelly integrating a plurality of "enameled wires" may be used as the primary coil.

When a wire rod having a three-layered insulating coating is used, the insulating interlayer taping between the primary coil and the secondary coil can be omitted. This saves the labor and time for transformer formation. In addition, the transformer can be made more compact. Even when the primary coil or the secondary coil is formed as an air-core coil without using the bobbin as the winding core, the transformer can be made compact.

[Bobbin]

The bobbin used in the present invention is not particularly limited. The shapes of the through hole and whole bobbin are decided to rectangular, elliptical, or circular shapes in accordance with the sectional shape of the magnetic core to be inserted. As the material of the bobbin, a resin such as polybutylene terephthalate, polyamide, phenol, or epoxy resin is used. A glass filler grade is used as needed.

When a self-bonding winding is used, the through hole in which a core is to be inserted can be formed by the primary coil or the secondary coil. Hence, a transformer having no bobbin can be formed.

[Core]

The core used in the present invention is not particularly limited. An Mn—Zn— or Ni—Zn-based ferrite core is preferably used because of its use temperature and properties that allow easy formation of a desired shape. Especially, a core having high permeability and high saturation flux density is preferably used.

The core preferably has a main magnetic leg to be inserted into the through hole of the bobbin, side magnetic legs arranged around the secondary coil and primary coils, and a bridge portion that connects the main magnetic leg and side magnetic legs. For example, an EE type, EI type, EER type, or EIR type described in JIS C 2514 "E type ferrite magnetic cores", an RM type or EP type described in JIS C 2516 "pot type ferrite magnetic cores" can be used. A ferrite core available from TDK, or an EEM type, LP type, or EPC type can also appropriately be used.

Embodiments as examples of the present invention will be described below on the basis of the above-described arrangement.

FIRST EMBODIMENT

In this embodiment, a transformer assembly according to the present invention, and a power conversion apparatus and solar power generation apparatus using the transformer assembly will be described.

Figure 8:
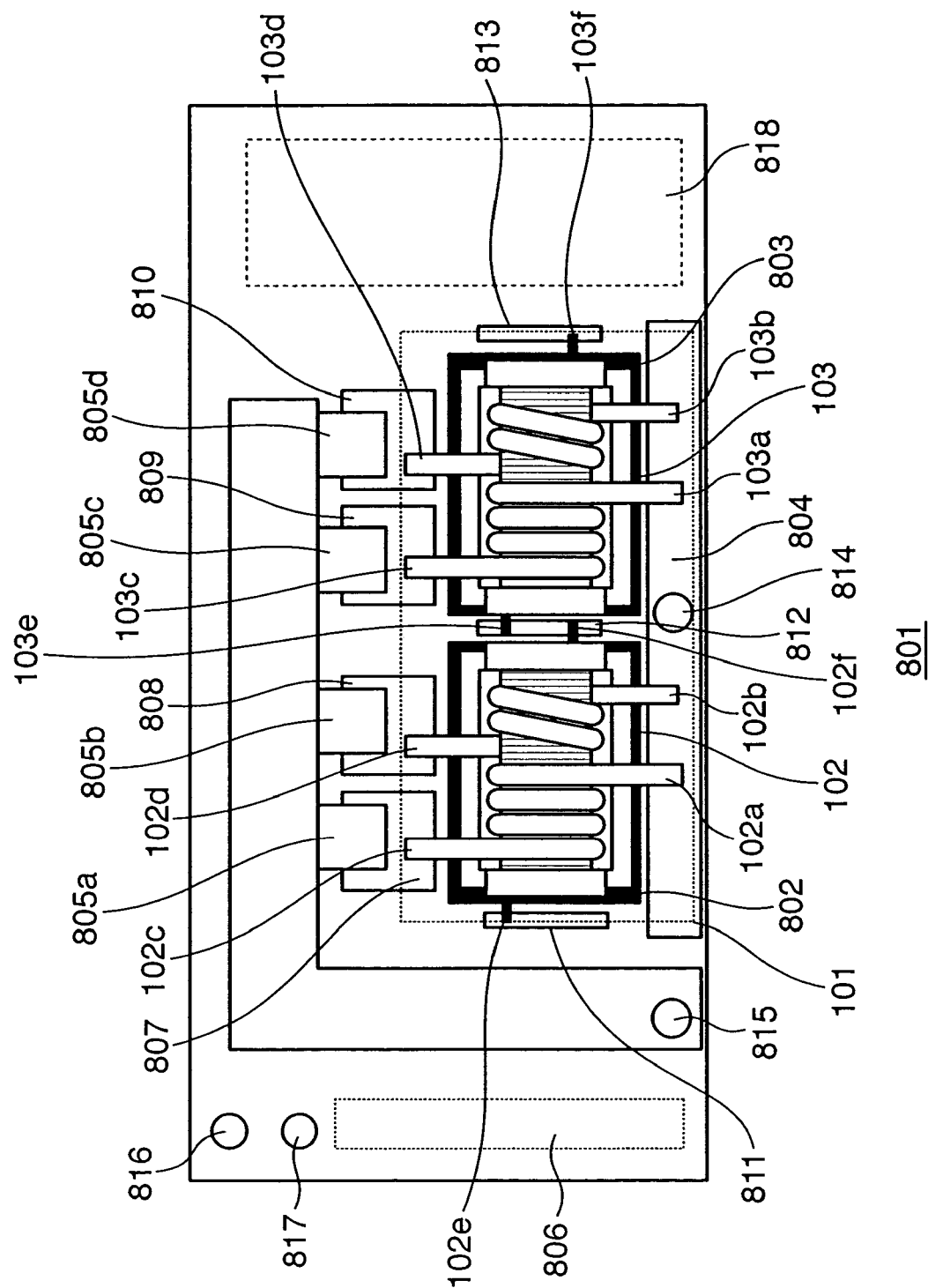
FIG. 8 is a view showing the component layout of the circuit board of a power conversion apparatus according to the first embodiment of the present invention.

FIG. 8 is a view for explaining a transformer assembly according to this embodiment, in which one transformer is placed in the lead-out direction of the output terminals of the primary coils, and two transformers are placed in the lead-out direction of the output terminals of the secondary coils, that is, N=1 and M=2. In each of transformers 102 and 103, the number of turns is three for the primary coil and 225 for the secondary coil so that a high-step-up transformer is formed. As described above, in this embodiment, the primary coils are connected in parallel.

A detailed method of forming this transformer will be described below in accordance with the sequence.

In this embodiment, an EE12-17.7-3 core available from Hitachi Ferrite Electronics is used as a core. FIG. 3 is a view showing details of the transformer used in this embodiment.

One end of a class-1 polyurethane electric wire (1UEW) having a diameter of 0.1 mm is soldered to one terminal 102$e$ of a bobbin 303 adaptive to the core. The electric wire is wound around the drum portion of the bobbin 303 225 times in multiple layers of proper alignment. Then, the other end of the electric wire is soldered to the other terminal 102$f$ to form a secondary coil 304.

For primary coils 104 and 105, a flat-type lead wire having a width of 1 mm and a thickness of 0.7 mm is wound in a rectangular shape on the secondary coil while changing the winding direction, thereby forming the primary coils, as shown in FIG. 4.

Cores 301 and 302 are inserted from both sides into the through hole of the bobbin 303. The side surfaces of the cores are double-bonded and fixed by using a polyester adhesive tape No. 31C available from NITTO DENKO, which includes a 55-μm base and a 25-μm adhesive sheet, thereby forming the transformers 102 and 103.

The distal ends of the primary coils are made to project by 3 mm from the outer surfaces of the cores and soldered to form terminals 102a to 102d and 103a to 103d. The transformers are placed on a circuit board 801 of the power conversion apparatus as shown in FIG. 8.

Holes 802 and 803 which receive the transformers are formed in the circuit board in advance. The transformers 102 and 103 are inserted and arrayed in the holes.

The terminals 102a and 102b and the terminals 103a and 103b are arranged on a land 804. The terminals 102c, 102d, 103c, and 103d are arranged on lands 807 to 810, respectively, on which MOSFETs 805a to 805d to be connected to the terminals are arranged.

The terminals 102e and 103f are arranged on lands 811 and 813, respectively. The terminals 102f and 103e are arranged on a land 812. The lands and terminals are soldered to form a transformer assembly 101 of this embodiment.

Accordingly, the terminals 102c, 102d, 103c, and 103d of the transformers 102 and 103 are connected to the separate MOSFETs HAT2164H 805a to 805d available from Hitachi, respectively. The terminals 102e and 103f are connected to a diode bridge 806 by a wiring pattern (not shown).

Figure 7:
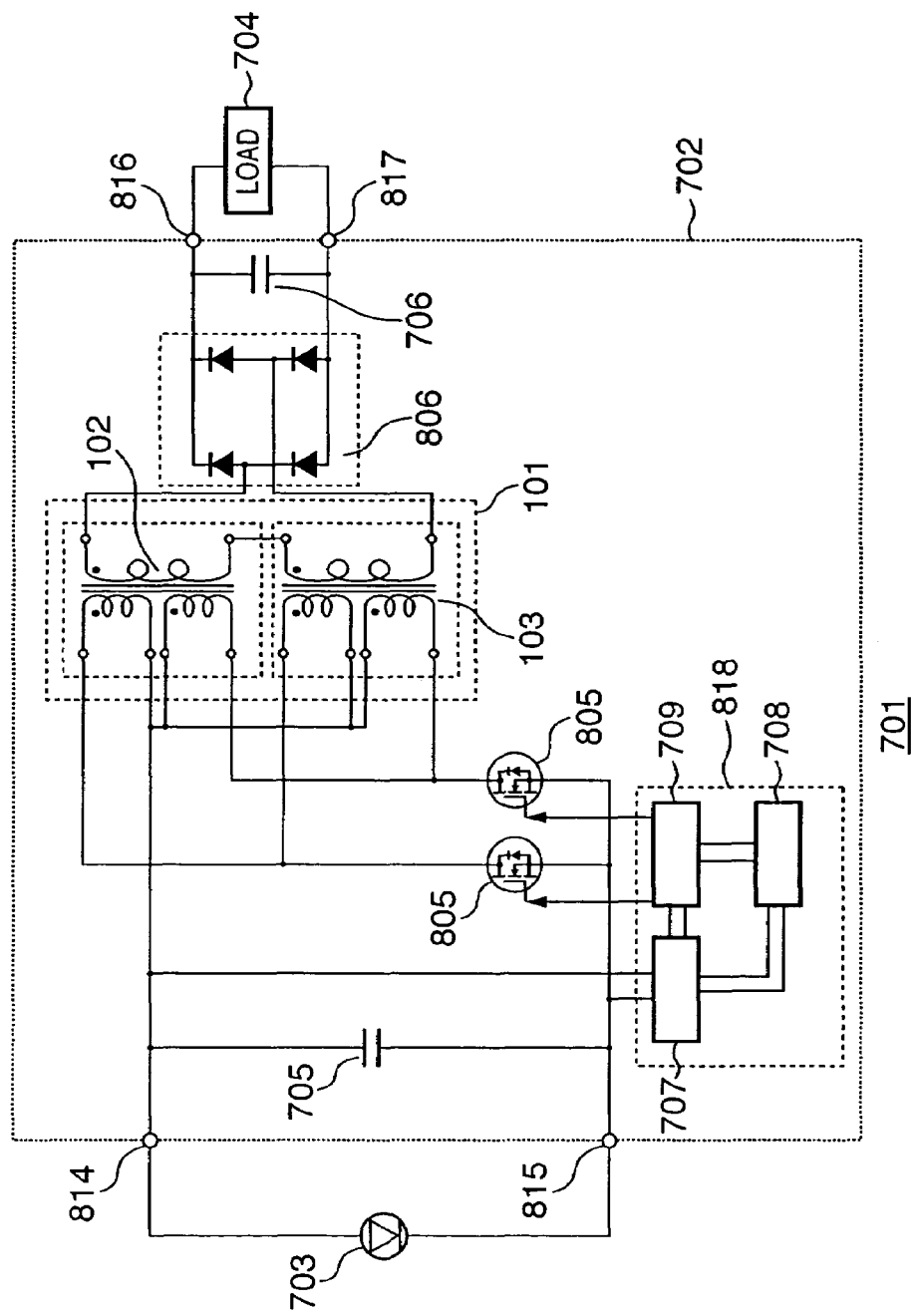
FIG. 7 is a circuit diagram showing an example of a solar power generation apparatus according to the first embodiment of the present invention.

FIG. 7 is a schematic circuit diagram of a power conversion apparatus 702 using the above-described transformer assembly 101, and a solar power generation apparatus 701 constituted by connecting a solar battery 703 and load 704 to the apparatus 702. The outline of the operation of the power conversion apparatus 702 will be described with reference to FIG. 7.

A DC power input from the solar battery 703 to the input terminal of the power conversion apparatus 702 is smoothed by a capacitor 705 and supplied to switching elements 805 such as MOSFETs through the transformer assembly 101. The DC power is converted into an AC power by alternately turning on/off the switching elements 805.

The AC power input to the transformer assembly 101 is stepped up in accordance with the transformation ratio (3:450 in this embodiment) of the transformer assembly 101, rectified by a diode bridge 806, and converted into a DC power.

The DC power is smoothed by a capacitor 706 and supplied to the load 704. Depending on the specifications of the pulsating current component and noise component of the DC power supplied to the load 704, a filter inductor may be inserted between the diode bridge 806 and the capacitor 706, or both the inductor and capacitor may be omitted.

The operation of a control circuit 818 will be described next. The control circuit 818 shown in FIG. 7 includes a control power supply unit 707, reference wave generation unit 708, and driver 709. When the input voltage to the power conversion apparatus 702 reaches the voltage at which the control power supply unit 707 is activated, a power is supplied from the control power supply unit 707 to the reference wave generation unit 708 and driver 709.

The reference wave generation unit 708 generates a reference rectangular wave having a preset frequency and supplies it to the driver 709. On the basis of the reference rectangular wave, the driver 709 generates gate driving signals S1 and S2 which alternately turn on/off the switching elements 805, and supplies the gate driving signals S1 and S2 to the gates of the switching elements 805 to turn on/off the switching elements.

The solar battery 703 used in this embodiment operates at an optimum operating voltage of 1 V and optimum operating current of 10 A under an intensity of 1 sun when a solar simulator is used. An output of 150 V and 61 mA could be obtained from the power conversion apparatus by appropriately adjusting the load. As descried above, according to the structure of the transformer assembly of the first embodiment, transformers in which primary coil terminals and secondary coil terminals are arranged on the opposite sides of cores are placed in a line in the horizontal direction and connected. Accordingly, a high-efficiency low-profile high-step-up transformer assembly can be formed. Hence, a high-efficiency low-profile high-step-up power conversion apparatus using the transformer assembly can be provided.

SECOND EMBODIMENT

A transformer assembly used in the second embodiment will be described below. A detailed description of components which are substantially the same as in the above-described first embodiment will be omitted.

Figure 9:
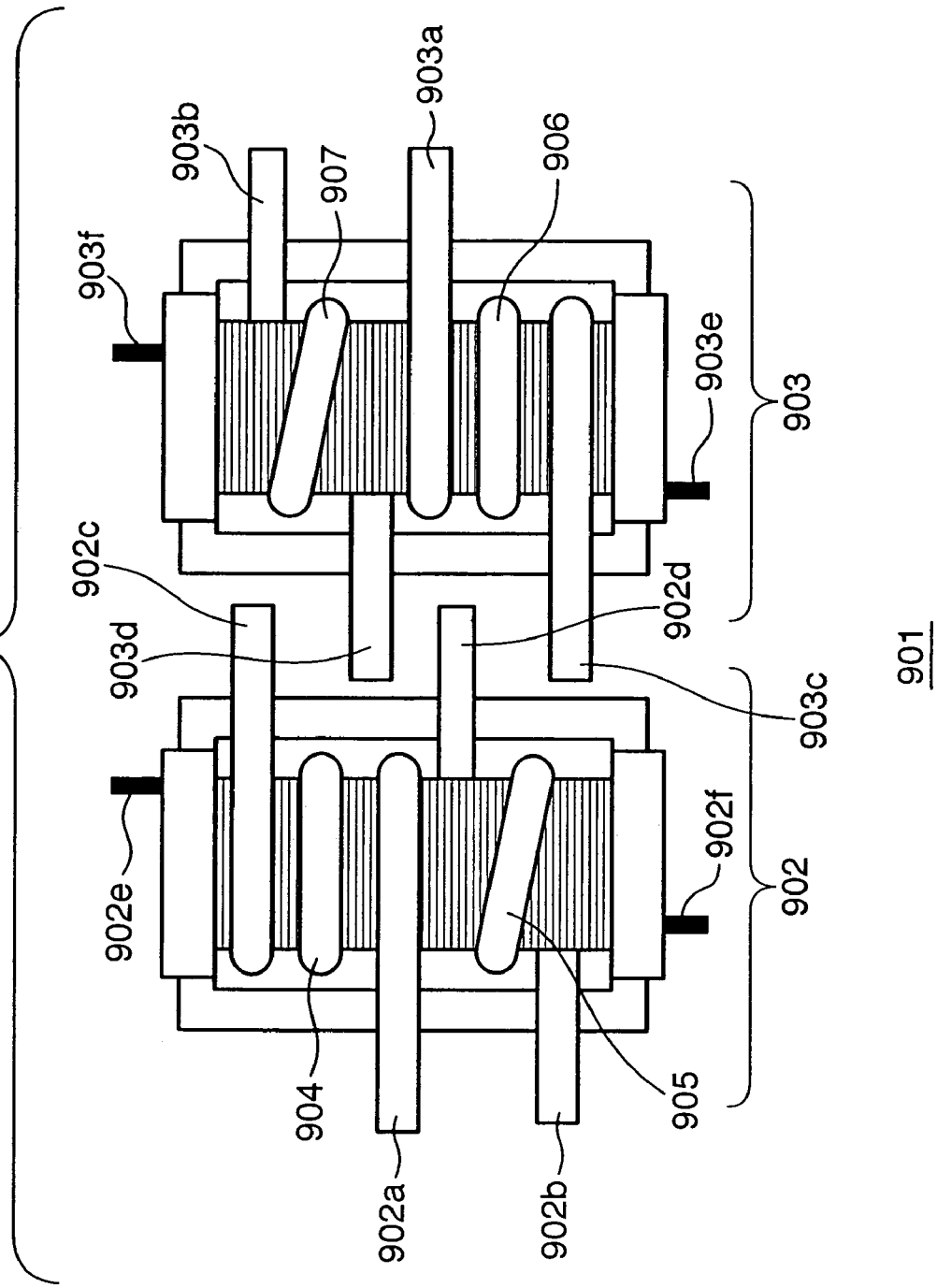
FIG. 9 is a view showing an example of a transformer assembly according to the second embodiment of the present invention.

FIG. 9 is a schematic view of a transformer assembly 901 according to the second embodiment, in which two transformers are placed in the lead-out direction of the output terminals of the primary coils, and one transformer is placed in the lead-out direction of the output terminals of the secondary coils, that is, N=2 and M=1. In each of transformers 902 and 903, the number of turns is two for the primary coil and 225 for the secondary coil so that a high-step-up transformer is formed. As described above, in this embodiment, the primary coils are connected in series.

The transformers 902 and 903 used in this embodiment are the same as those described in the first embodiment except the number of turns of the primary coil, and a description thereof will be omitted.

Figure 11:
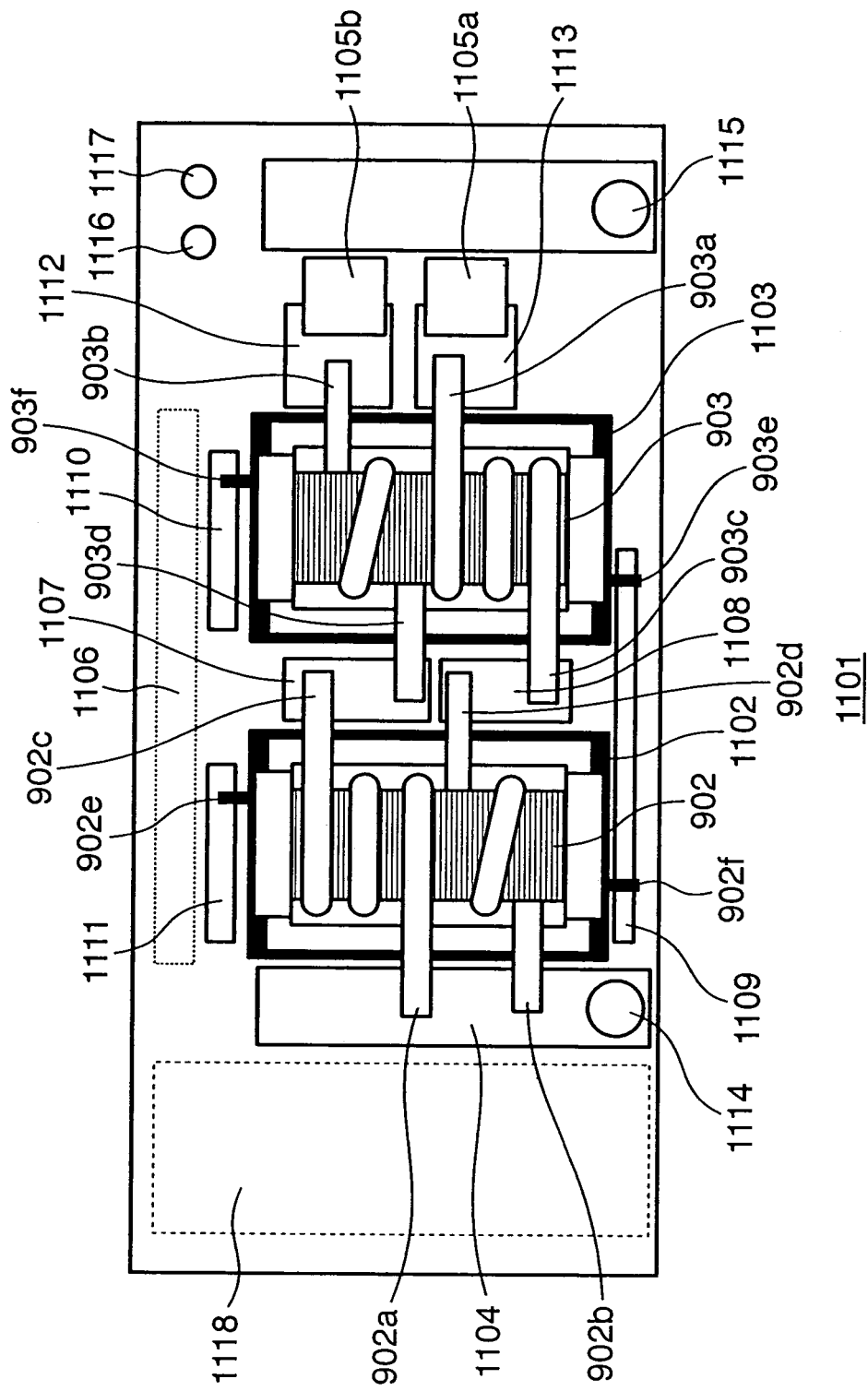
FIG. 11 is a view showing the component layout of the circuit board of a power conversion apparatus according to the second embodiment of the present invention.

The transformers are placed on a circuit board 1101 of a power conversion apparatus as shown in FIG. 11. Holes 1102 and 1103 which receive the transformers are formed in the circuit board in advance. The transformers 902 and 903 are inserted and arrayed in the holes.

The transformers 902 and 903 have the same structure. In inserting them in the holes, the orientation of the transformer 903 is reversed to that of the transformer 902 by 180° such that terminals 902c and 902d oppose terminals 903d and, 903c, respectively.

Terminals 902a and 902b are arranged on a land 1104. Terminals 903a and 903b are arranged on lands 1113 and 1112, respectively, on which MOSFETs 1105a and 1105b to be connected to the terminals are arranged.

The terminals 902c and 903d and the terminals 902d and 903c are arranged on lands 1107 and 1108, respectively. Terminals 903e and 902f are arranged on a land 1109. Terminals 902e and 903f are arranged on lands 1111 and 1110, respectively. The lands and terminals are soldered to form the transformer assembly according to this embodiment, in which the primary coils having different winding directions are connected in series.

The terminals 903a and 903b of the transformer 903 are connected to the separate MOSFETs HAT2164H 1105a and 1105b available from Hitachi, respectively. The terminals 902e and 903f are connected to a diode bridge 1106 by a wiring pattern (not shown).

Figure 10:
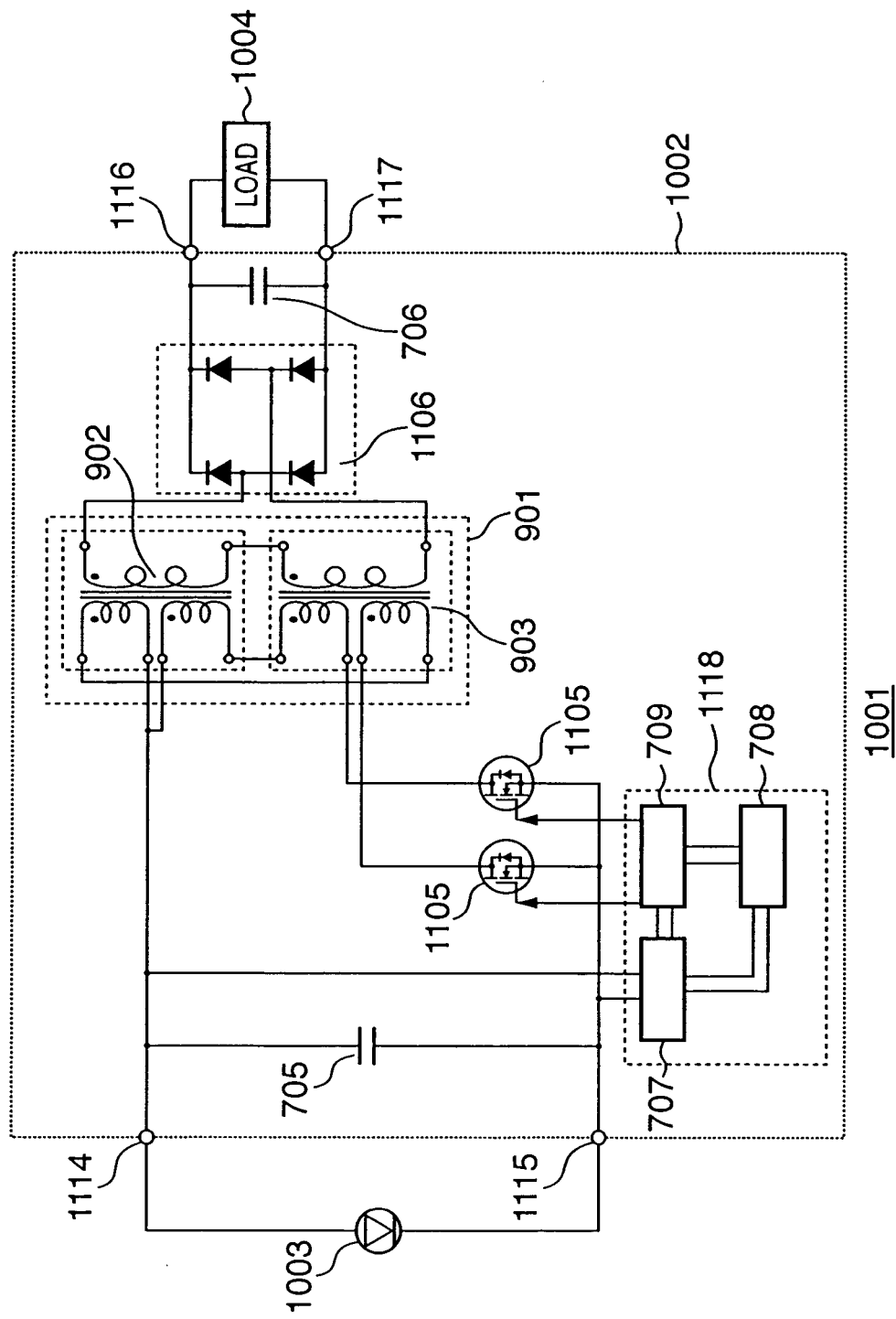
FIG. 10 is a circuit diagram showing an example of a solar power generation apparatus according to the second embodiment of the present invention.

A power conversion apparatus 1002 is constituted by using the transformer assembly 901 formed by using the circuit board shown in FIG. 11. A solar power generation apparatus 1001 shown in FIG. 10 is constituted by connecting a solar battery 1003 and load 1004 to the apparatus 1002.

The detailed operations of the circuits are almost the same as in the power conversion apparatus used in the first embodiment, and a description thereof will be omitted.

In this embodiment, as the solar battery 1003, a solar battery having three layers of pin structures is used. In this solar battery, the output voltage per solar battery is larger than that of the solar battery used in the first embodiment. That is, the input voltage to the power conversion apparatus is large.

In the transformer assembly of this embodiment, however, the primary coils of the transformers are connected in series. Hence, the voltage applied to one primary coil of one transformer is about ½ the input voltage. Since the use magnetic flux density of the core can be reduced, the number of turns can be decreased to ⅔ that in the first embodiment, and core loss can be decreased.

The solar battery operates at an optimum operating voltage of 1.4 V and optimum operating current of 10 A under an intensity of 1 sun when a solar simulator is used. The voltage is stepped up in accordance with the step-up ratio of the transformer assembly. An output of 157 V and 87 mA could be obtained from the power conversion apparatus by appropriately adjusting the load.

As descried above, according to the structure of the transformer assembly of the second embodiment, transformers in which primary coil terminals and secondary coil terminals are arranged on the opposite sides of cores are placed in a line in the lead-out direction of the primary coil terminals. The primary coils having different winding directions and opposing each other between the transformers are connected on the lands 1107 and 1108. The secondary coils are connected on the land 1109. Accordingly, a high-efficiency low-profile high-step-up transformer assembly can be formed. Hence, a high-efficiency low-profile high-step-up power conversion apparatus using the transformer assembly can be provided.

THIRD EMBODIMENT

A transformer assembly used in the third embodiment will be described below. A detailed description of components which are substantially the same as in the first or second embodiment will be omitted.

Figure 12:
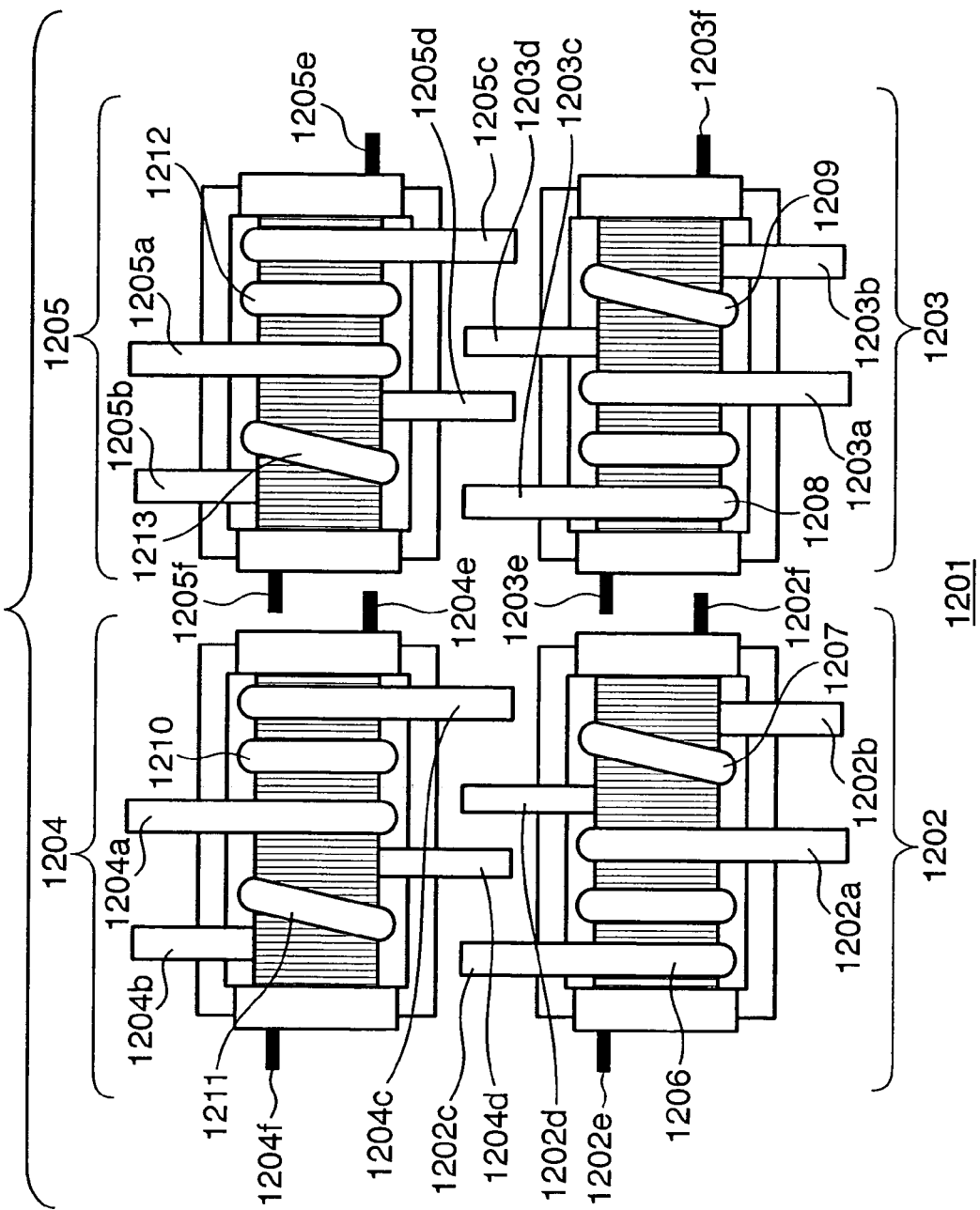
FIG. 12 is a view showing an example of a transformer assembly according to the third embodiment of the present invention.

FIG. 12 is a schematic view of a transformer assembly 1201 according to this embodiment, in which two transformers are placed in the lead-out direction of the output terminals of the primary coils, and two transformers are placed in the lead-out direction of the output terminals of the secondary coils, that is, N=2 and M=2. In each of transformers 1202, 1203, 1204, and 1205, the number of turns is two for the primary coil and 225 for the secondary coil so that a high-step-up transformer is formed.

The transformers 1202 to 1205 used in this embodiment are the same as those described in the first embodiment, and a description thereof will be omitted.

Figure 13:
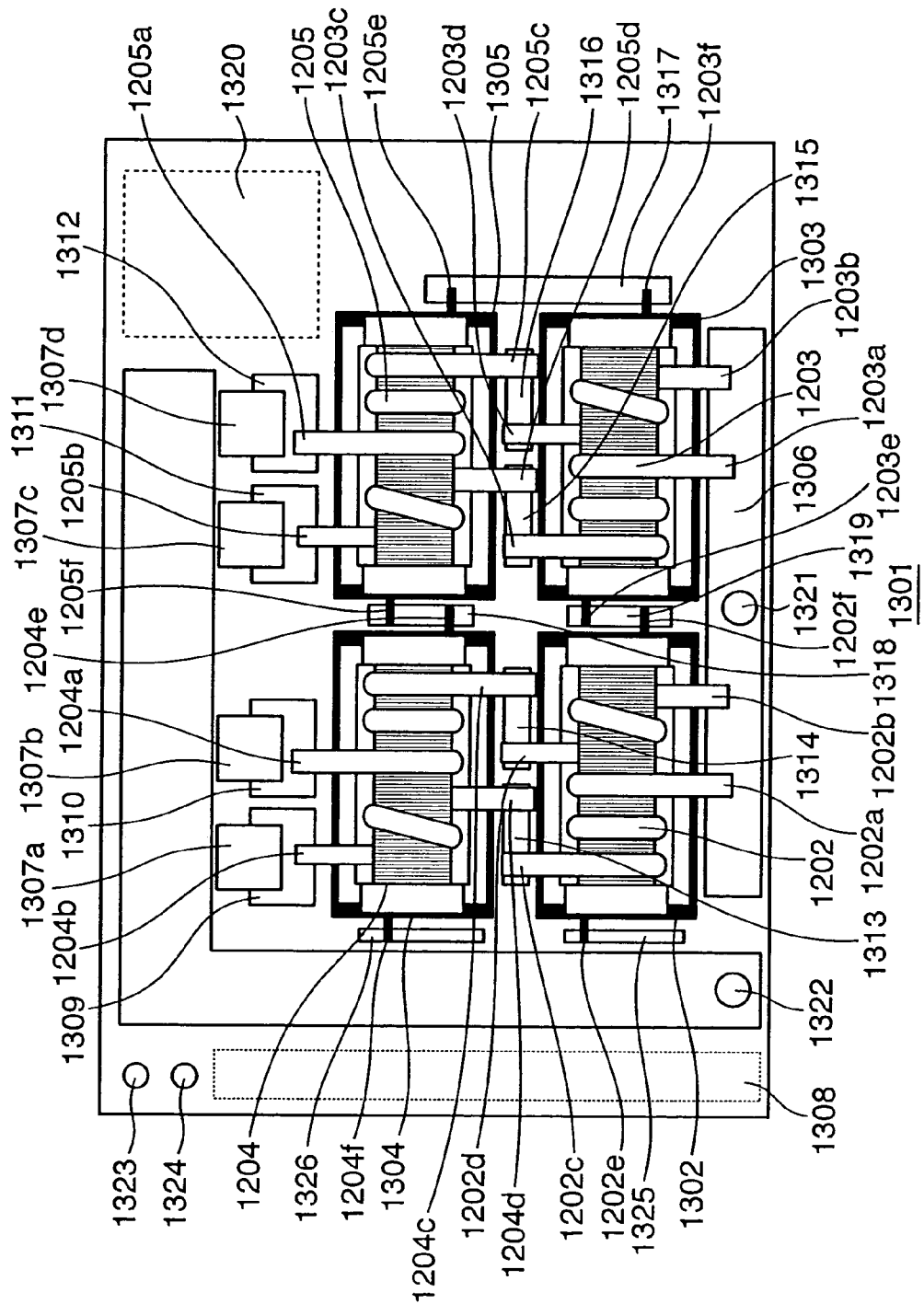
FIG. 13 is a view showing the component layout of the circuit board of a power conversion apparatus according to the third embodiment of the present invention.

The transformers are placed on a circuit board 1301 of a power conversion apparatus as shown in FIG. 13. Holes 1302 to 1305 which receive the transformers are formed in the circuit board in advance. The transformers 1202 to 1205 are inserted and arrayed in the holes.

The transformers 1202 to 1205 have the same structure. In inserting them in the holes, the orientation of the transformer 1204 is reversed to that of the transformer 1202 by 180° such that terminals 1202*c* and 1202*d* oppose terminals 1204*d* and 1204*c*, respectively. In addition, the orientation of the transformer 1205 is reversed to that of the transformer 1203 by 180° such that terminals 1203*c* and 1203*d* oppose terminals 1205*d* and 1205*c*, respectively.

Terminals 1202*a*, 1202*b*, 1203*a*, and 1203*b* are arranged on a land 1306. Terminals 1204*b*, 1204*a*, 1205*b*, and 1205*a* are arranged on lands 1309 to 1312, respectively, on which MOSFETs 1307*a* to 1307*d* to be connected to the terminals are arranged.

The terminals 1202*c* and 1204*d*, the terminals 1202*d* and 1204*c*, the terminals 1203*c* and 1205*d*, and the terminals 1203*d* and 1205*c* are arranged on lands 1313 to 1316, respectively.

Terminals 1203*f* and 1205*e* are arranged on a land 1317. Terminals 1205*f* and 1204*e* and terminals 1203*e* and 1202*f* are arranged on lands 1318 and 1319, respectively. A terminal 1202*e* is arranged on a land 1325. A terminal 1204*f* is arranged on a land 1326.

The lands and terminals are soldered to form the transformer assembly according to this embodiment. The terminals 1204*b*, 1204*a*, 1205*b*, and 1205*a* of the transformers 1204 and 1205 are connected to the separate MOSFETs HAT2164H 1307*a* to 1307*d* available from Hitachi, respectively.

Figure 14:
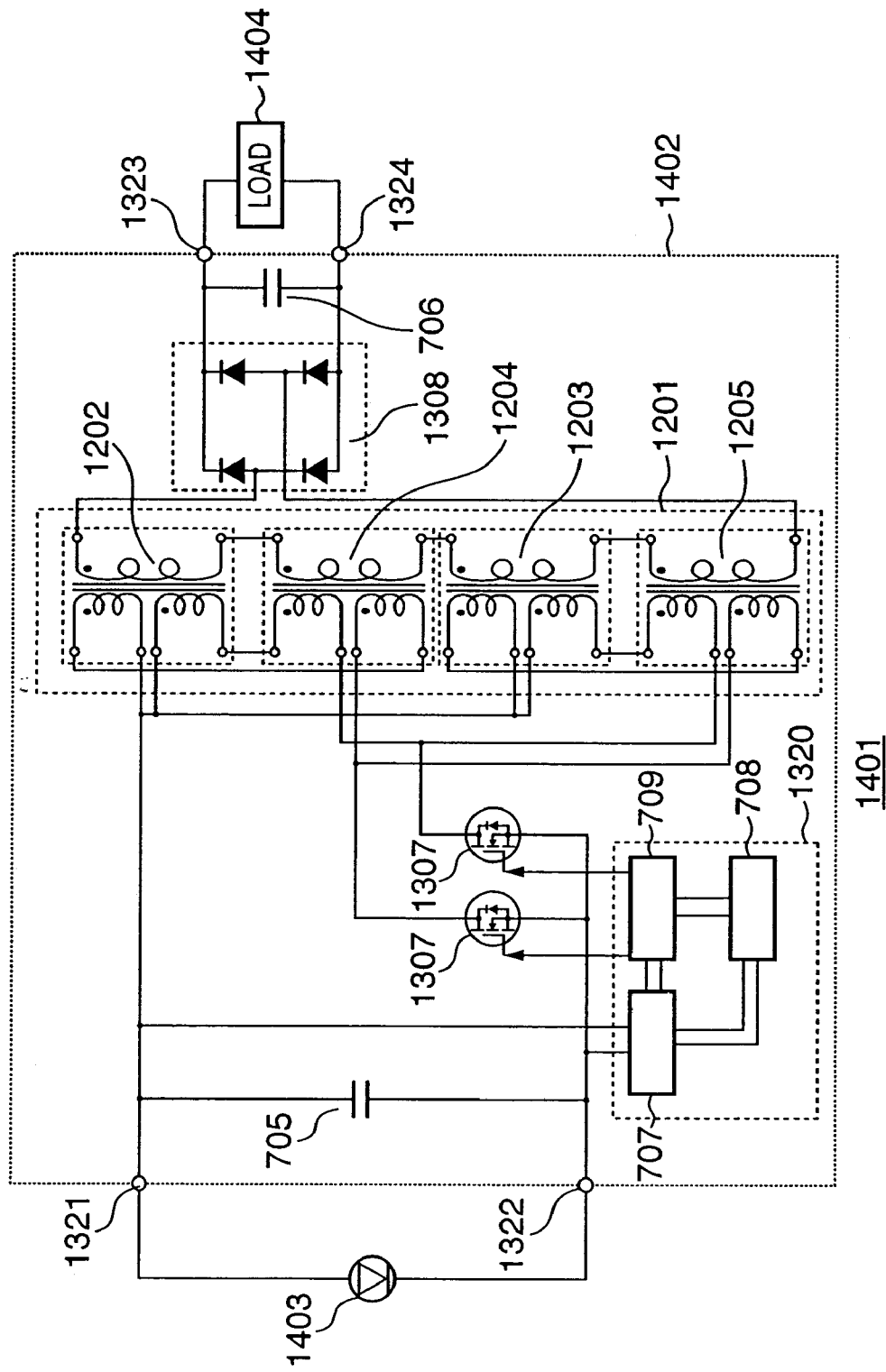
FIG. 14 is a circuit diagram showing an example of a solar power generation apparatus according to the third embodiment of the present invention.

The terminals 1202*e* and 1204*f* are connected to a diode bridge 1308. A power conversion apparatus 1402 is constituted by using the transformer assembly 1301 formed by using the circuit board shown in FIG. 13, and a solar power generation apparatus 1401 is constituted by connecting a solar battery 1403 and load 1404 to the apparatus 1402, as shown in FIG. 14.

The detailed operations of the circuits are almost the same as in the power conversion apparatus used in the first embodiment, and a description thereof will be omitted. In this embodiment, the same solar battery as that used in the second embodiment is used as the solar battery 1403. The solar battery operates at an optimum operating voltage of 1.4 V and optimum operating current of 10 A under an intensity of 1 sun when a solar simulator is used. The voltage is stepped up in accordance with the step-up ratio of the transformer assembly. An output of 315 V and 43 mA could be obtained from the power conversion apparatus by appropriately adjusting the load.

As descried above, according to the structure of the transformer assembly of the third embodiment, two transformers are placed in a line in each of the lead-out direction of the primary coil terminals and the lead-out direction of the secondary coil terminals. In the transformers, the primary coil terminals and secondary coil terminals are arranged on the opposite sides of cores. The primary coils having different winding directions and opposing each other between the transformer 1202 and the transformer 1204 and between the transformer 1203 and the transformer 1205 are connected on the lands 1313 to 1316. The secondary coils of the transformers 1202 and 1203 and those of the transformers 1204 and 1205, which are arrayed in the lead-out direction of the secondary coil terminals, are connected on the lands 1318 and 1319. Accordingly, a high-efficiency low-profile high-step-up transformer assembly can be formed. Hence, a high-efficiency low-profile high-step-up power conversion apparatus using the transformer assembly can be provided.

OTHER EMBODIMENTS

In the above embodiments of the present invention, a transformer used for a push-pull circuit in a power conversion apparatus has been described. However, the transformer and transformer assembly of the present invention can also be applied to any other circuit scheme.

In the embodiments, one solar power generation apparatus is connected to a resistance load. Another system may be constituted by connecting a plurality of solar power generation apparatuses in parallel and connecting a system interconnection inverter so that a DC power output from the solar battery is converted into an AC power and connected to systems.

As described above, according to the present invention corresponding to the above embodiments, the lead-out direction of primary coil terminals and that of secondary coil terminals are made to cross, and the terminals are arranged on the opposite sides of cores. Hence, a high-efficiency high-step-up low-profile transformer can be formed by using a low-resistance conductor such as a flat-type copper wire which is difficult to process in directions other than the winding direction.

In addition, when a plurality of transformers are arrayed, and corresponding terminals are connected, a high-step-up transformer assembly can easily be formed. The terminals can be connected on the same land by the shortest route without using any through hole on the circuit board. Hence, the efficiency of a power conversion apparatus using the transformer assembly can be increased.

Furthermore, since the transformer assembly can be formed by using transformers with the same structure, the transformers need not individually be managed.

As described above, according to the present invention, the thickness of a transformer can be reduced. In addition, the decrease in efficiency due to the wiring resistance in connection between the terminals of transformers can be prevented.

As many apparently widely different embodiments of the present invention can be made without departing from the spirit and scope thereof, it is to be understood that the invention is not limited to the specific embodiments thereof except as defined in the appended claims.

What is claimed is:

1. A transformer assembly formed by using a plurality of transformers each formed by winding a primary coil and a secondary coil around a winding core, comprising:

N transformers are arrayed in a lead-out direction of terminals of the primary coil while M transformers are arrayed in a lead-out direction of terminals of the secondary coil, wherein said transformer has one terminal and the other terminal of the primary coil are arranged on opposite sides of the winding core, one terminal and the other terminal of the secondary coil are arranged on opposite sides of the winding core, and is formed to make a line which connects said one terminal and said other terminal of the primary coil cross a line which connects said one terminal and said other terminal of the secondary coil.

2. The assembly according to claim 1, wherein said plurality of transformers substantially have the same structure.

3. The assembly according to claim 1, wherein a winding direction of the primary coil on the winding core is substantially the same as the lead-out direction of the terminals of the primary coil.

4. The assembly according to claim 1, wherein when said plurality of transformers are arrayed in the lead-out direction of the terminals of the primary coil, primary coils having opposite winding directions are connected between the transformers which are arrayed adjacent to each other.

5. The assembly according to claim 4, wherein in connection, the terminals are connected through lands on a printed circuit board.

6. The assembly according to claim 1, wherein the transformer is a push-pull transformer.

7. The assembly according to claim 6, wherein the transformer has at least two primary coils, and the primary coils have opposite winding directions on the winding core of the transformer.

8. The assembly according to claim 6, wherein when said plurality of transformers are arrayed in the lead-out direction of the terminals of the primary coil, every other transformer is reversed by 180°.

9. The assembly according to claim 1, wherein the terminals of the primary coil and the secondary coil are formed on the same plane, the transformers are inserted in holes formed on the printed circuit board, and the terminals are connected to the lands on the printed circuit board.

10. A power conversion apparatus using a transformer assembly of claim 1.

11. A solar power generation apparatus using a power conversion apparatus of claim 10 and a solar battery.

* * * * *

UNITED STATES PATENT AND TRADEMARK OFFICE
CERTIFICATE OF CORRECTION

PATENT NO. : 7,078,997 B2 Page 1 of 1
APPLICATION NO. : 10/835009
DATED : July 18, 2006
INVENTOR(S) : Fumitaka Toyomura It is certified that error appears in the above-identified patent and that said Letters Patent is hereby corrected as shown below:

COLUMN 1:
Line 61, "assembles" should read -- assemblies --.

COLUMN 8:
Line 10, "descried" should read -- described --.

COLUMN 9:
Line 29, "descried" should read -- described --.

COLUMN 10:
Line 49, "descried"should read -- described --.

COLUMN 11:
Line 1, "EMBODIMENTS" should read -- EMBODIMENT --;
Line 48, "are arrayed" should read -- arrayed --; and
Line 49, "coil while M transformers are" should read -- coil; and M transformers --.

COLUMN 12:
Line 3, "coil are" should read -- coil --; and
Line 6, "are arranged" should read -- arranged --.

Signed and Sealed this

Thirteenth Day of March, 2007

JON W. DUDAS
*Director of the United States Patent and Trademark Office*

UNITED STATES PATENT AND TRADEMARK OFFICE
CERTIFICATE OF CORRECTION

PATENT NO. : 7,078,997 B2
APPLICATION NO. : 10/835009
DATED : July 18, 2006
INVENTOR(S) : Fumitaka Toyomura It is certified that error appears in the above-identified patent and that said Letters Patent is hereby corrected as shown below:

COLUMN 1:
Line 61, "assembles" should read -- assemblies --.

COLUMN 8:
Line 10, "descried" should read -- described --.

COLUMN 9:
Line 29, "descried" should read -- described --.

COLUMN 10:
Line 49, "descried" should read -- described --.

COLUMN 11:
Line 1, "EMBODIMENTS" should read -- EMBODIMENT --;
Line 48, "are arrayed" should read -- arrayed --; and
Line 49, "coil while M transformers are" should read -- coil; and M transformers --.

COLUMN 12:
Line 3, "coil are" should read -- coil --; and
Line 6, "are arranged" should read -- arranged --.

Signed and Sealed this

Twenty-seventh Day of March, 2007

JON W. DUDAS
*Director of the United States Patent and Trademark Office*